United States Patent [19]

Häuslein et al.

[11] 4,379,352
[45] Apr. 12, 1983

[54] MOTOR VEHICLE SEAT AND PROCESS RELATING THERETO

[75] Inventors: Siegfried Häuslein; Hans Steinberger; Willibald Heigl, all of Munich; Georg Scheichl, Unterschleissheim; Erwin Kauderer, Munich, all of Fed. Rep. of Germany

[73] Assignee: Bayerische Motoren Werke A.G., Munich, Fed. Rep. of Germany

[21] Appl. No.: 135,527

[22] Filed: Mar. 31, 1980

[30] Foreign Application Priority Data

Mar. 29, 1979 [DE] Fed. Rep. of Germany ....... 2912461

[51] Int. Cl.³ .............................................. A47C 7/02
[52] U.S. Cl. ........................................ 5/471; 297/452
[58] Field of Search ................... 5/471, 472, 402, 411; 297/452, 219, 229

[56] References Cited

U.S. PATENT DOCUMENTS

| | | | |
|---|---|---|---|
| 737,089 | 8/1903 | Donaldson | 5/475 |
| 3,075,862 | 1/1963 | Hoyer | 5/402 X |
| 3,630,572 | 12/1971 | Homier | 5/471 |
| 3,632,164 | 1/1972 | Radke | 297/452 |
| 3,649,974 | 3/1972 | Barath et al. | 5/402 |
| 3,711,155 | 1/1973 | Bandel et al. | 5/471 |
| 3,778,853 | 12/1973 | Cooper | 5/472 |
| 3,951,455 | 4/1976 | Bandel et al. | 297/452 |
| 3,961,823 | 6/1976 | Caudill, Jr. | 5/471 |
| 4,057,292 | 11/1977 | Arnold | 297/452 |

*Primary Examiner*—Francis K. Zugel
*Attorney, Agent, or Firm*—Craig & Burns

[57] ABSTRACT

A seat, especially a motor vehicle seat, which includes a seat component and a back component. The seat component and/or back component each include a spring core, a cushion layer, and a ribbed upholstery cover provided with securing tabs fixed to the rib seams. Only an end portion of each securing tab is attached to the respective rib seams with a free end portion of the securing tabs being adapted to be fixed by a fastening element to the spring core. A method is also proposed wherein at least one single strip of material is disposed so as to extend transversely of the ribs of the upholstery cover with the strip of material being fixed at the respective seams and subsequently severed mid-way between adjacent ribs so as to form a plurality of juxtaposed securing tabs. The free end portions of the resulting securing tabs are then folded up to enable a fixing by the fastening elements.

6 Claims, 3 Drawing Figures

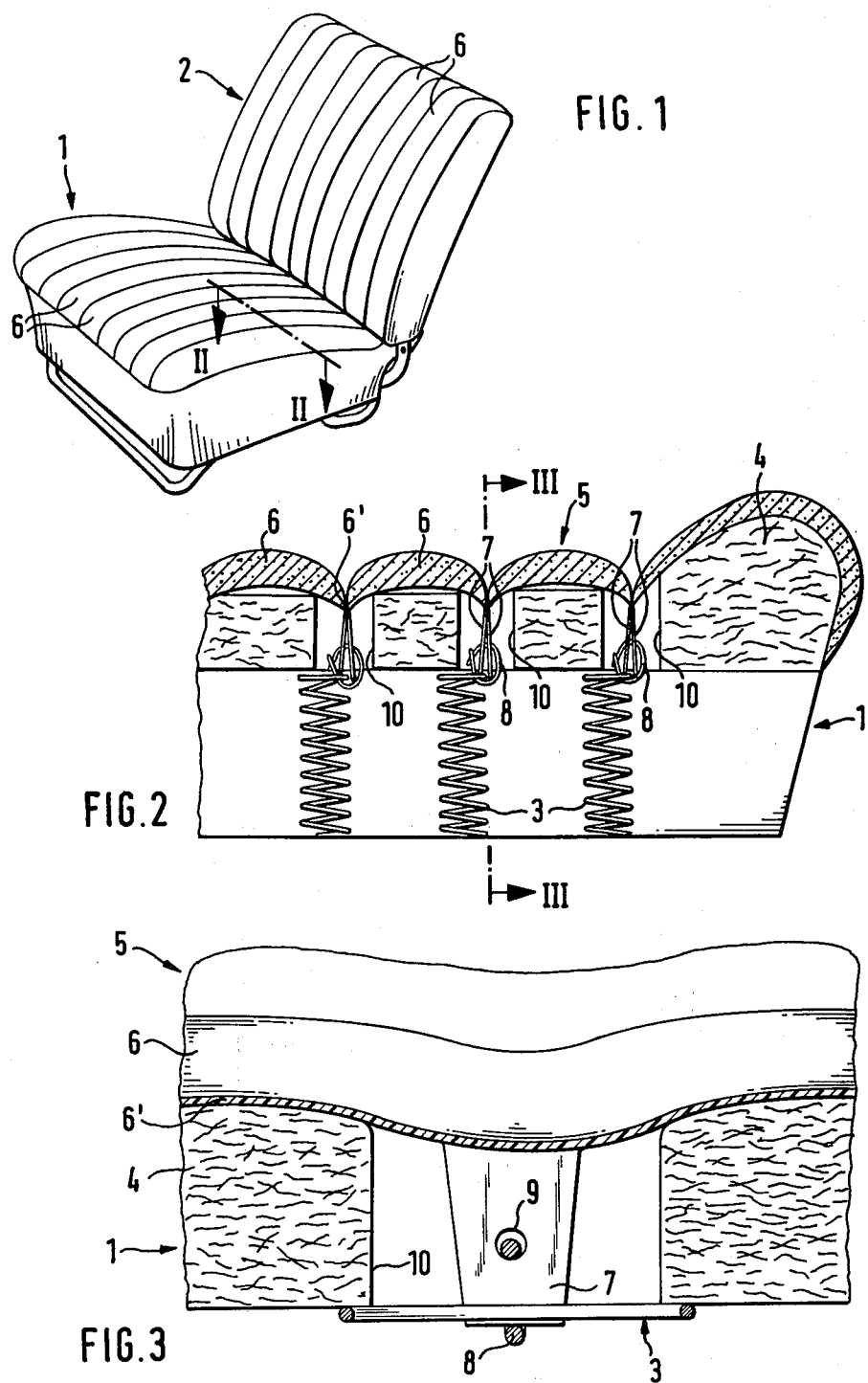

MOTOR VEHICLE SEAT AND PROCESS RELATING THERETO

The present invention relates to a seat construction and, more particularly, to a motor vehicle seat which includes a seat component and a back component, with at least the seat component including a spring core, cushion layer, and a ribbed upholstery cover which is provided at the bottom surface thereof facing the cushion layer, and with securing tabs, attached to the seams of the ribbed upholstery cover, for connecting the upholstery cover, under prestress conditions, to a base of the vehicle seat by retaining elements, and a method for affixing the securing tabs to the upholstery cover.

In one seat construction of the aforementioned type, it has been proposed to provide securing tabs consisting of separate sections of a strip, extending transversely of the ribbed upholstery cover, fixed to each rib seam. The securing tabs are adapted to be introduced into openings in the cushion layer provided in an area of the securing tabs so as to enable a securing of the upholstery cover to the seat. In this proposed construction, the securing tabs are fixed to the cushion layer by fastening elements in contact with the bottom, with the fastening elements being formed as plastic members. Since the securing tabs extend substantially in the form of a V from the ribbed seams to the underlying plastic member, the edges of the ribs are drawn down at an angle to the middle of the seams near the securing tabs so that an outer curvature of the ribs is slightly telescoped thereby resulting in an unsightly appearance especially in the area of the outer ribs. Additionally, in this proposed construction, the upholstery cover is simply held down on the cushion layer so that after a length of time of using the seat, the upholstery cover may bulge upwardly.

In Auslegeschrift No. 2,023,803, another seat construction is proposed wherein a seat comprising a foam cushion layer has retaining wires embedded in the foam with a plurality of retaining strips being fixed to the bottom of the upholstery cover and being connected by a retaining wire. The retaining wire embedded in the foam and the retaining wire connecting the retaining strips are connected together by ring clamps. A disadvantage of this proposed construction resides in the fact that the person sitting on the seat is exposed to unpleasant pressure of the retaining wires. Moreover, by virtue of the arrangement of the retaining wires transversely to the ribs, trough-shaped recesses are formed along the retaining wires on the outside of the upholstery cover as a result of the prestressing with which the upholstery cover is connected to the cushion layer. As can readily be appreciated, for reasons of style and appearance, the provision of recesses visible on the outside of the upholstery cover must be avoided as much as possible.

In Auslegeschrift No. 1,942,308, a seat construction is proposed wherein an upholstery layer is fixed to the spring core by fastening means along a dividing line between the middle portions and side portions. In this proposed construction the upper end of the fastening means is located on the outside of the upholstery layer and such construction appears to be suitable only for the specifically disclosed structure.

The aim underlying the present invention essentially resides in providing a motor vehicle seat construction wherein a ribbed upholstery cover is connected to a base of a seat cushion component and/or a back component in such a manner that especially the outer curvature of the ribs of the ribbed upholstery cover remains unchanged when the upholstery cover is fastened as well as a method for mounting a plurality of juxtaposed securing tabs to the upholstery cover.

In accordance with advantageous features of the present invention, only one end portion of each securing tab is fixed to a corresponding rib seam with a free end portion of the respective securing tabs being connected to a fastening element attachable to a spring core of the vehicle seat.

By virtue of the above-noted features of the present invention, since only one end of each of the securing tabs is fixed to the rib seams, the tab is pulled vertically downward by the fastening element attached to the spring core so that the cross sectional contour of the ribs is not substantially deformed during a fastening operation such as, for example, a stapling operation. Moreover, the fastening or stapling is effected directly to the respective rib seams. Moreover, since only one securing tab may be placed at any point of the rib seam the fastening arrangement of the present invention advantageously performs the function of a point type fastening arrangement. Also, a soft anatomically beneficial upholstery structure adapted to the body with optimum sitting comfort is provided because no metal element may act on the person sitting on the seat when a load pressure is applied to the upholstery. Finally, the fastening elements for fastening the upholstery cover to the vehicle seat, applied to the free end portions of the securing tabs, are mounted from above the seat through the cushion layer thereby resulting in a saving of time and economy in comparison to an assembly of the above-noted proposed seat constructions.

Advantageously, in accordance with the present invention, the securing tabs are made from a single strip of elastic material with the fastening of the single strip of elastic material to the bottom side of the upholstery cover at the respective rib seams being accomplished by high frequency welding.

To facilitate the attaching of each securing tab to the spring core of the vehicle seat, the free end portion of each securing tab is provided with an opening for accommodating the fastening element. Advantageously, the fastening element may be formed as a wire staple.

Additionally, so as to prevent metallic contact between the wire staple and the spring core, advantageously in accordance with the present invention, when the wire staple is crimped or clinched portions of the free end of the securing tabs are in contact with the spring coil of the spring core thereby interposing sound absorbing layers between the wire staple and the coil of the spring core.

In accordance with advantageous features of the process of the present invention, a plurality of juxtaposed securing tabs may be installed on the upholstery cover by disposing a strip of the elastic material so as to extend transversely of the ribs of the upholstery cover, which strip of material is provided with openings for accommodating the fastening elements. The strip of material has a length which corresponds substantially to the total number of ribs on the upholstery cover such that the respective ends of the strip of material extend beyond the respective last ribs of the upholstery cover. The strip is attached to the rib seams and subsequently severed mid-way between adjacent ribs thereby resulting in a plurality of securing tabs. Finally, the free end portions of the resulting securing tabs are folded up and the fastening elements are inserted through the openings provided therein. By virtue of the features of the process of the present invention, a series of juxtaposed securing tabs may be set-up in an extremely short period of time.

Accordingly, it is an object of the present invention to provide a vehicle seat construction which avoids, by simple means, shortcomings and disadvantages encountered in the prior art.

Another object of the present invention resides in providing a vehicle seat construction which enables a durable connection between an upholstery cover and a base of the vehicle seat without affecting the sitting comfort of such seat.

Yet another object of the present invention resides in providing a vehicle seat construction which enables a point-like securing of an upholstery cover to the vehicle seat.

A further object of the present invention resides in providing a vehicle seat construction by which the outer curvature of the upholstery cover remains unchanged when the upholstery cover is fastened to a base of the seat.

A still further object of the present invention resides in providing a method for mounting a plurality of juxtaposed securing tabs to an upholstery cover adapted to be fastened to a vehicle seat.

These and other objects, features, and advantages of the present invention will become more apparent from the following description when taken in connection with the accompanying drawings which show, for the purposes of illustration only, one embodiment in accordance with the present invention, and wherein:

FIG. 1 is a perspective view of a motor vehicle seat in accordance with the present invention;

FIG. 2 is a cross sectional view, on an enlarged scale, taken along the line II—II in FIG. 1; and FIG. 3 is a cross sectional view, on an enlarged scale, taken along the line III—III in FIG. 2.

Referring now to the drawings wherein like reference numerals are used throughout the various views to designate like parts and, more particularly, to FIG. 1, according to this Figure, a motor vehicle seat includes a seat component generally designated by the reference numeral 1 and a back component generally designated by the reference numeral 2, with the upholstery structure of the seat component 1 and back component 2 being identical. Thus, while the description hereinbelow refers to the seat component 1, it is to be understood that such description is equally applicable to the back component 2 of the motor vehicle seat.

As shown most clearly in FIG. 2, the seat component 1 is provided with a spring core 3 on which a cushion layer 4, of rubber filaments, is mounted. The cushion layer 4 is covered by an upholstery cover generally designated by the reference numeral 5 which includes a plurality of parallel ribs 6. Two substantially equal sized securing tabs 7, formed by a single element and juxtaposed in a series, are arranged at the bottom of the upholstery cover 5 at respective rib seams 6' of the ribs 6. One end portion of each securing tab 7 is attached to the respective rib seams 6' and an opposite free end portion of each securing tab 7 is adapted to be connected by a fastening element such as, for example, a C-shaped wire staple 8, to a coil of the spring core 3.

As shown most clearly in FIG. 3, the free end portion of each securing tab 7 is provided with an opening 9 for receiving the wire staple 8. Preferably, the securing tabs 7 are made of a suitable elastic material and are securely fixed to the rib seams 6' by, for example, high frequency welding. An opening or hole 10 is provided in the cushion layer 4 in a region of each of the securing tabs 7 for enabling the securing tabs and associated wire staples 7 to pass through the cushion layer 4 to the spring core 3.

To mount the upholstery cover 5 on the cushion layer 4, the preformed C-shaped wire staple is introduced at the top of the cushion layer 4 into the opening layer 9 of the respective pair of securing tabs 7 attached to the respective rib seams 6'. The securing tab 7 and staple 8 are then passed through the respective openings or holes 10. Subsequently, the bottom end of the staple 8 is hooked on the spring core 3 and the staple is clinched or crimped with special pliers until portions of the securing tabs 7 are in contact with a part of the spring coil of the spring core 3. Since portions of the securing tabs 7 contact part of the spring coil of the spring core 3, the staple 8 is not in metallic contact with the spring core 3. Thus, a portion of the securing tabs 7 form sound absorbing layers which are interposed between the staple 8 and the spring core 3.

The length of the securing tab 7 is determined so that the upholstery cover 5 lies under prestress conditions on the cushion layer 4 after the securing tabs 7 have been fixed to the spring core 3. When the fastening by the wire staples 8 is properly carried out, the elasticity of the elastic material of the securing tabs 7 contributes to maintaining the continuous tension of the upholstery cover 5 on the cushion layer 4.

In accordance with the method of the present invention, a one piece strip of elastic material is disposed transversely of the ribs 6. The strip of elastic material has a total length which is greater than the total number of the ribs 6 of the upholstery cover 5 and is provided with the holes or openings 9 at a predetermined spacing along the length of the strip. The strip of material is efficiently and securely mounted at the bottom of the upholstery cover 5 by being attached by, for example, high frequency welding, to the respective rib seams 6'. The strip of elastic material is then severed midway between adjacent ribs 6 thereby resulting in the formation of a plurality of juxtaposed securing tabs 7. The securing tabs 7 at the respective seams 6' are then folded toward each other and the fastening elements such as, the wire staple 8 is introduced into the openings 9. The securing tabs 7 and wire staples 8 are then introduced into the openings 10 in the cushion layer 4 and the wire staples 8 are crimped or clinched so as to secure the upholstery cover to the spring core 3. As can readily be appreciated, the number of strips of material for forming the series of securing tabs at the respective rib seams 6' as well as the relative positioning of the strips of material are governed by, for example, the size of the upholstery cover 5 as well as the configuration of the vehicle seat.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A seat comprising a seat component and a back component, at least one of the seat component and back component including a spring core, a cushion layer, and a ribbed upholstery cover provided with a plurality of spaced parallel ribs defined by spaced parallel rib seams, a plurality of individual securing tabs being provided at respective portions along the rib seams on a side of the upholstery cover which faces the cushion layer for connecting the upholstery cover to the spring core in an essentially point type fastening arrangement, each securing tab including a first end portion attached to a seam of the ribs and a free end portion which is secured directly to a coil of the spring core by a fastener.

2. A seat according to claim 1, characterized in that an opening is provided in the free end portion of each securing tab for accommodating the associated fastener.

3. A seat according to one of claims 1 or 2, characterized in that the securing tabs are made of an elastic material, and in that the securing tabs are attached to the seams of the ribs by high frequency welding.

4. A seat according to claim 3, characterized in that the fasteners are each formed as a wire staple.

5. A seat according to one of claims 1 or 2 characterized in that the seat is a motor vehicle seat.

6. A seat according to claim 5, characterized in that the fasteners are each formed as a wire staple.

* * * * *